Patented Feb. 8, 1927.

1,616,587

UNITED STATES PATENT OFFICE.

WILLIAM F. LITTLE, OF KALAMAZOO, MICHIGAN, ASSIGNOR TO THE UPJOHN COMPANY, OF KALAMAZOO, MICHIGAN.

METHOD OF MANUFACTURING EFFERVESCENT ALKALI COMPOUNDS.

No Drawing.    Application filed August 25, 1926.   Serial No. 131,546.

This invention relates to improved methods of manufacturing effervescent alkali compounds. It has particularly to do with the production of the compound described in U. S. Letters Patent No. 1,526,981, issued Feb. 17, 1925, to Frederick W. Heyl, of Kalamazoo, Michigan.

The object of the invention is to simplify the preparation of the product and dispense with the use of vacuum driers.

To produce the material according to my improved method I take by weight dry citric acid 25 parts, dry tartaric acid 15 parts, dry sodium bicarbonate 67.8 parts, potassium bicarbonate 1 part, calcium lactate 5 parts, along with small additional parts of sodium chloride, magnesium sulphate or lactate, and sodium phosphate. The quantities of magnesia, phosphoric acid, chlorine, potash and lime may be calculated to approximate the relative proportions of these elements in the blood or serum. Thus the alkalies administered are balanced and on a rational basis related to the basal requirements of the body.

The alkaline ingredients are mixed and the organic acids are added.

This mixture is introduced by a conveyor into a fusing drier in which the percentage of relative humidity is controlled in its relation to the drying temperature. The mass is sprayed with 90 per cent alcohol with a fine spray to lay the dust before or while the material is being introduced into the fusing drier. The temperature and humidity in the fusing drier are controlled and regulated by a wet and dry bulb thermometer, the dry bulb of which registers 200 degrees Fahr. and the wet bulb 130 degrees Fahr.

When the mass has been sufficiently fused so that the powder constituting the same agglomerates in the mass, the same is withdrawn from the fusing drier and the mass is cooled and broken up into granules of the required size, the dust forming being preferably sifted out and the granulated mass is passed to a final progressive tunnel drier where the same is advanced on conveyors, reaching a final temperature of 168 degrees Fahr. which is sufficient to effectively dry the same. The dried granular mass is packed and enclosed in hermetically sealed packages, preferably bottles with suitable caps, and it is ready for use as an effervescent salt for medicinal use. By this method a satisfactory product is made without the necessity of using the vacuum drier, that being dispensed with and a very good product produced without its use.

Having thus described my invention what I claim as new and desire to secure by Letters Patent is:

1. The process of preparing an effervescent salt consisting in admixing sodium carbonate and calcium lactate in the proportions of five to one, with a mixture of tartaric and citric acids, and additional sodium bicarbonate, all in powdered form, sufficient to react with the said acids, spraying the same with 90 per cent alcohol sufficient to lay any dust tending to rise from such powder, passing the mass to a fusing drier in which the temperature and moisture are controlled, to register on a wet and dry thermometer as 200 degrees Fahr. on the dry bulb and 130 Fahr. on the wet bulb; when the mass has been fused and its particles agglomerated, breaking the same into granules and desiccating the granules by passing the same through a progressive drier with a final temperature of 168 degrees Fahr.

2. The process of preparing an effervescent salt consisting in admixing sodium bicarbonate therewith, and adding suitable acid and further sodium bicarbonate sufficient to react with said acids, all in powdered form, spraying the same with an unreactive organic medium to lay any dust, passing the same to a fusing drier in which the moisture is controlled and in which a wet and dry bulb thermometer shows a comparatively high degree of temperature on the dry bulb over the wet bulb and the temperature is such as to fuse the powdered mass, causing it to agglomerate, then withdrawing the agglomerated mass and breaking the same into granules and passing the granules through a progressive drier to a final temperature sufficient to desiccate the same.

3. The process of preparing an effervescent salt consisting in mixing said salt with bicarbonate of soda and suitable acids in powdered form, spraying the same with an unreactive organic medium, fusing the mass in a fusing drier in the presence of moisture and at high temperature until the powder agglomerates, withdrawing the agglomerated mass, breaking the same into granules, and passing the granules through a progressive drier to a final temperature sufficient to desiccate the same.

In witness whereof I have hereunto set my hand.

WILLIAM F. LITTLE.